United States Patent
Chen et al.

(10) Patent No.: US 9,875,168 B2
(45) Date of Patent: Jan. 23, 2018

(54) AUTOMATIC CONNECTION DETECTION IN A DATA CENTER

(71) Applicant: International Business Machines Corporation, Armonk, NY (US)

(72) Inventors: Chang W. Chen, Cedar Park, TX (US); Jin Yan Huang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 14/832,184

(22) Filed: Aug. 21, 2015

(65) Prior Publication Data

US 2017/0052864 A1    Feb. 23, 2017

(51) Int. Cl.
| | |
|---|---|
| *G06F 11/30* | (2006.01) |
| *G06F 3/06* | (2006.01) |
| *G06F 13/40* | (2006.01) |
| *G06F 13/42* | (2006.01) |

(52) U.S. Cl.
CPC ........ *G06F 11/3051* (2013.01); *G06F 3/0605* (2013.01); *G06F 3/067* (2013.01); *G06F 3/0635* (2013.01); *G06F 13/4022* (2013.01); *G06F 13/4247* (2013.01)

(58) Field of Classification Search
CPC .................................................. G06F 11/3051
See application file for complete search history.

(56) References Cited

U.S. PATENT DOCUMENTS

| | | | |
|---|---|---|---|
| 6,243,020 B1* | 6/2001 | Lam | G06F 13/1605 |
| | | | 340/635 |
| 6,968,994 B1* | 11/2005 | Ashwood Smith | G01R 31/023 |
| | | | 235/375 |
| 7,130,385 B1* | 10/2006 | Moon | H04M 11/04 |
| | | | 379/45 |
| 8,102,169 B2 | 1/2012 | Law et al. | |
| 8,260,132 B2 | 9/2012 | Aguren | |
| 8,566,833 B1* | 10/2013 | Biswas | G06F 9/5016 |
| | | | 709/213 |
| 2010/0008482 A1 | 1/2010 | Tucker | |
| 2011/0043371 A1 | 2/2011 | German et al. | |
| 2013/0138839 A1 | 5/2013 | Abuelsaad et al. | |
| 2014/0201260 A1 | 7/2014 | Dor et al. | |
| 2016/0057008 A1* | 2/2016 | Liu | H04L 41/0816 |
| | | | 709/217 |

OTHER PUBLICATIONS

Wagner et al., "Automatic Discovery of Fiber Optic Structured Cabling Component Locations and Connectivity", National Fiber Optic Engineers Conference 2012, Mar. 4-8, 2012, pp. 1-3, <https://www.osapublishing.org/abstract.cfm?URI=NFOEC-2012-NM3F.6&origin=search>.

* cited by examiner

*Primary Examiner* — Farley Abad
(74) *Attorney, Agent, or Firm* — Maeve Carpenter

(57) ABSTRACT

In an approach to automatic connection detection in an environment, the environment including a first device and a switching device, a first port on the first device being connected to a second port on the switching device, automatic connection detection occurs by associating a fifth port on the switching device to the second port. In response to detecting an identifier of a sixth port on a third device at the first port on the first device, it's determined that the sixth port on the third device is connected to the fifth port.

12 Claims, 5 Drawing Sheets

AUTOMATIC CONNECTION DETECTION IN A DATA CENTER

BACKGROUND

In environments like data centers, lots of homogeneous or heterogeneous devices are connected to one another. Those devices are often physically connected by cables. Connection information of the cables is important in many scenarios. For example, the connection information may be used to debug a configuration fault or plan a configuration change. A data center usually includes a great number of cables which can be arranged over the ceiling or under the floor tiles and are sometimes bundled together. As a result, the connection information of cables is hard to be maintained and verified.

Nowadays many data centers include low-level switching devices, such as Layer 1 (L1) switches, connected between servers, high-level switches and storage systems for test automation and connection management. Such low-level switching devices are often simple pass-through devices that do not care about the targets for connections and have no capability to detect any information about the targets. Therefore, information about the connections through the low-level switching devices cannot be detected unless using extra resources (cables or devices) or modifying existing cable connections.

SUMMARY

In general, example embodiments of the present invention include a method, device and computer program product for automatic connection detection.

In an aspect, embodiments of the present invention provide a computer-implemented method for use in an environment including a first device and a switching device, a first port on the first device being connected to a second port on the switching device. The method comprises associating a fifth port on the switching device to the second port. The method further comprises determining that a sixth port on a third device is connected to the fifth port in response to detecting an identifier of the sixth port on the third device at the first port on the first device.

In another aspect, embodiments of the present invention provide an apparatus for use in an environment including a first device and a switching device, a first port on the first device being connected to a second port on the switching device. The apparatus comprises a first port associating module configured to associate a fifth port on the switching device to the second port. The apparatus further comprises a first connection determining module configured to determine that a sixth port on a third device is connected to the fifth port in response to detecting an identifier of the sixth port on the third device at the first port on the first device.

In yet another aspect, embodiments of the present invention provide a computer program product comprising at least one computer readable tangible storage device, and program instructions stored on the at least one computer readable tangible storage device. The stored program instructions, when executed on a device for use in an environment including a first device and a switching device, a first port on the first device being connected to a second port on the switching device, cause the device to associate a fifth port on the switching device to the second port. The instructions, when executed on the device, further cause the device to determine that a sixth port on a third device is connected to the fifth port in response to detecting an identifier of the sixth port on the third device at the first port on the first device.

It is to be understood that the Summary is not intended to identify key or essential features of embodiments of the present invention, nor is it intended to be used to limit the scope of the present invention. Other features of the present invention will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principles of the present invention will now be described with reference to some example embodiments. It is to be understood that these embodiments are described only for the purpose of illustration and help those skilled in the art to understand and implement the present invention, without suggesting any limitations as to the scope of the invention. The invention described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
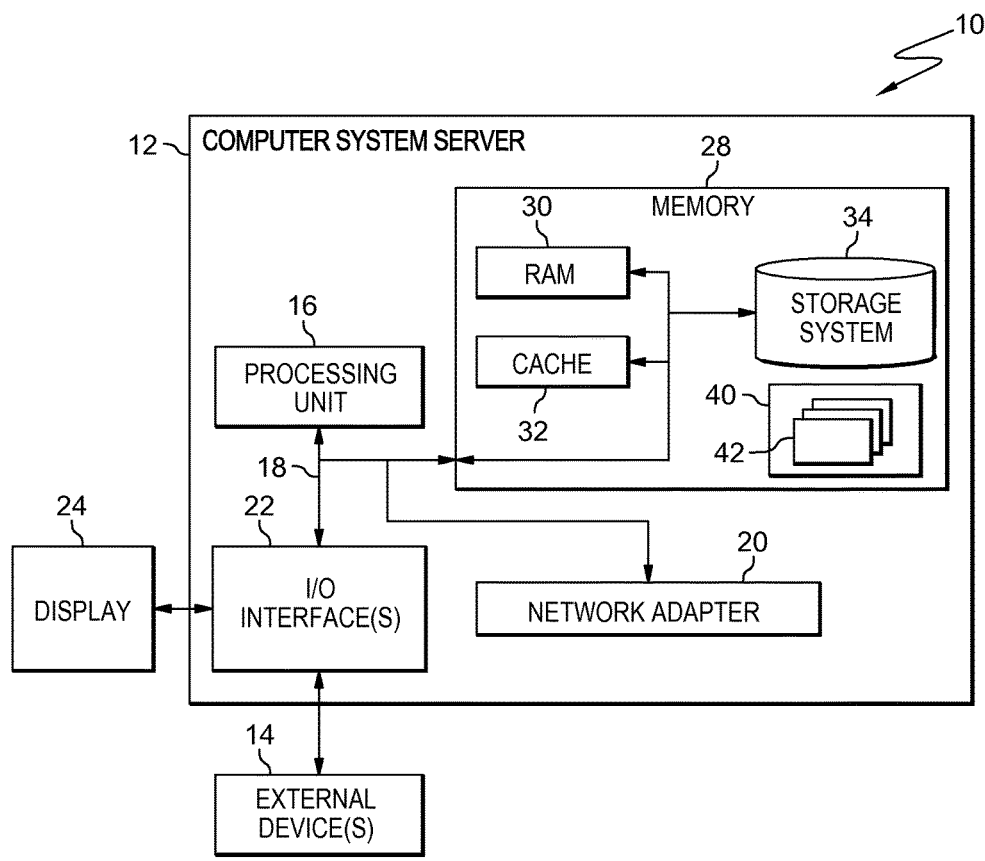
FIG. 1 is a block diagram of an electronic device in which embodiments of the present invention can be implemented.

Reference is first made to FIG. 1, depicting diagram 10, in which an exemplary electronic device or computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing unit(s) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Figure 2:
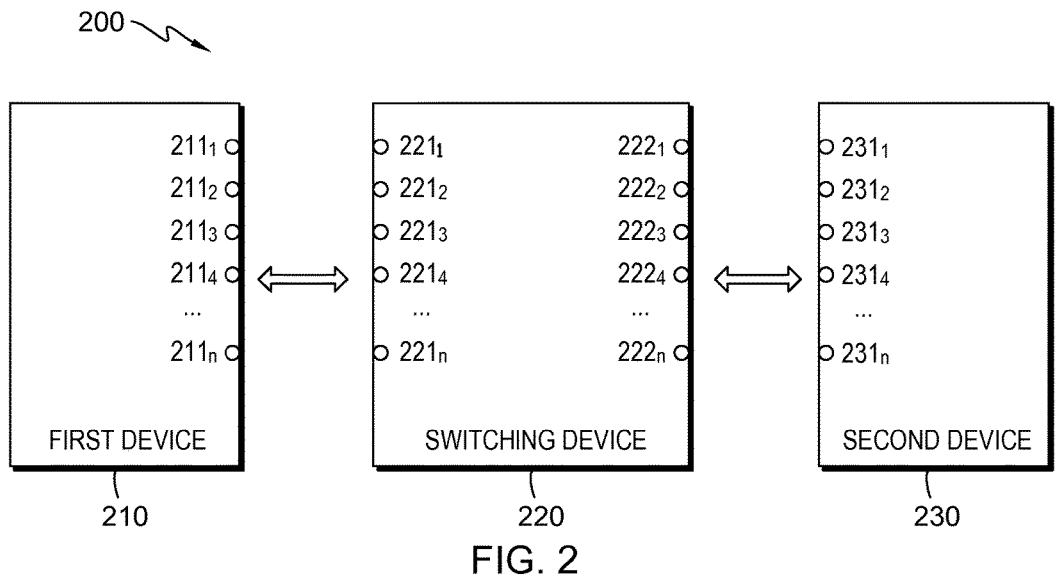
FIG. 2 is an environment in which the embodiments of the present invention can be implemented.

FIG. 2 shows an environment in which embodiments of the present invention can be implemented. As shown, the environment 200 includes a first device 210 and a second device 230 which are connected to one another via a switching device 220. One or more devices in the environment 200 may be implemented by computer system/server 12 as discussed with reference to FIG. 1, for example. In FIG. 2, the environment 200 is shown to include only one first device 210, one switching device 220 and one second device 230. This is merely for the purpose of illustration, without suggesting any limitation to the number of devices in the environment.

As used herein, the term "switching device" refers to a low-level device that is incapable of detecting any information about targets of connections. For example, in some embodiments, the environment 200 may be a storage area network (SAN) system. In such embodiments, the first device 210 may be a high-level switch in the SAN, the second device 230 may be a host or a storage device in the SAN, and the switching device 220 may be a L1 switch.

The devices 210-230 each include a plurality of ports. More particularly, the first device 210 includes ports $211_1$, $211_2 \ldots 211_n$ (collectively referred to as ports 211), and the second device 230 includes ports $231_1$, $231_2 \ldots 231_n$ (collectively referred to as ports 231). The switching device 220 includes two groups of ports, namely, ports $221_1$, $221_2 \ldots 221_n$ (collectively referred to as ports 221) and ports $222_1$, $222_2 \ldots 222_n$ (collectively referred to as ports 222). The devices may be connected via the ports. Particularly, one of the ports 211 of the first device 210 may be connected to one of the ports 221 of the switching device 220. This specific port 221 is internally associated with one of the ports 222 which is in turn connected to one of the ports 231 of the second device 230. As such, the first device 210 is connected to the second device 230 via the switching device 220. The connections between ports may be implemented by cables and/or any other suitable wired or wireless mechanism.

The associations between the ports 221 and 222 of the switching device 220 may be maintained in configuration information for the switching device 220. As an example, in those embodiments where the switching device 220 is a L1 switch in a SAN, such configuration information is known as "patches." Each patch specifies an association between one of the ports 221 and one of the ports 222. However, as described above, the switching device 220 is incapable of detecting the connection information by itself. As a result, although it is known that the first device 210 is connected to the second device 230 via the switching device 220, the specific ports involved in this connection is unknown and thus to be decided. That is, embodiments of the present invention detect the connections at the level of ports.

Figure 3:
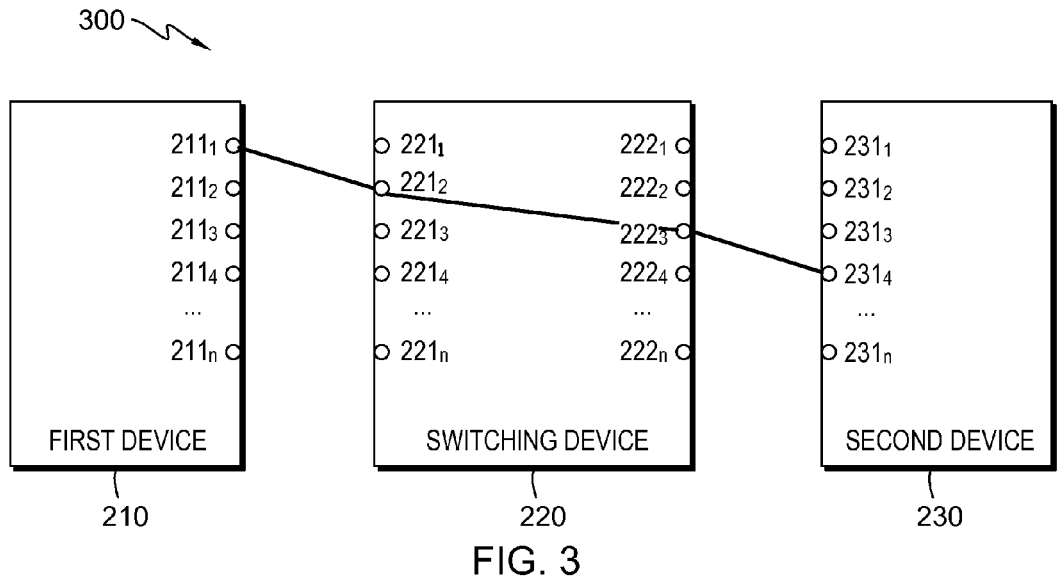
FIG. 3 is a schematic diagram for detecting one connection in accordance with embodiments of the present invention.

FIG. 3 shows a schematic diagram 300 for connection detection in accordance with embodiments of the present invention. In this example, the port $211_1$ of the first device 210 is connected to the port $221_2$ of the switching device 220. The port $221_2$ is associated with the port $222_3$ inside the switching device 220 and the port $222_3$ is connected to the port $231_4$ of the second device 230. Conventionally the connections of ports cannot be detected automatically, as described above. According to embodiments of the present invention, given the port $211_1$, it is possible to automatically determine the ports involved in the connection of the first and second devices 210 and 230.

Figure 4:
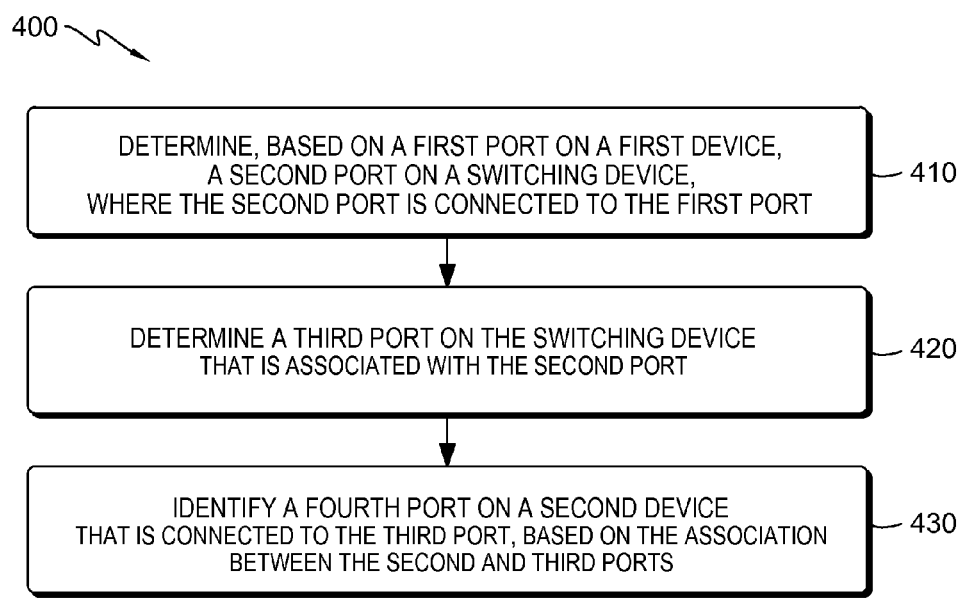
FIG. 4 is a flowchart of a method 400 for connection detection in accordance with embodiments of the present invention.

FIG. 4 shows a flowchart of a method 400 of connection detection in accordance with embodiments of the present invention. The method 400 will be described in connection with the example shown in FIG. 3. Only for the purpose of illustration, in the following discussions, the port $211_1$ on the first device 210 is referred to the "first port," the port $221_2$ and $222_3$ on the switching device 220 are referred to as the "second port" and "third port," respectively, and the port $231_4$ on the second device 230 is referred to as the "fourth port."

Figure 5:
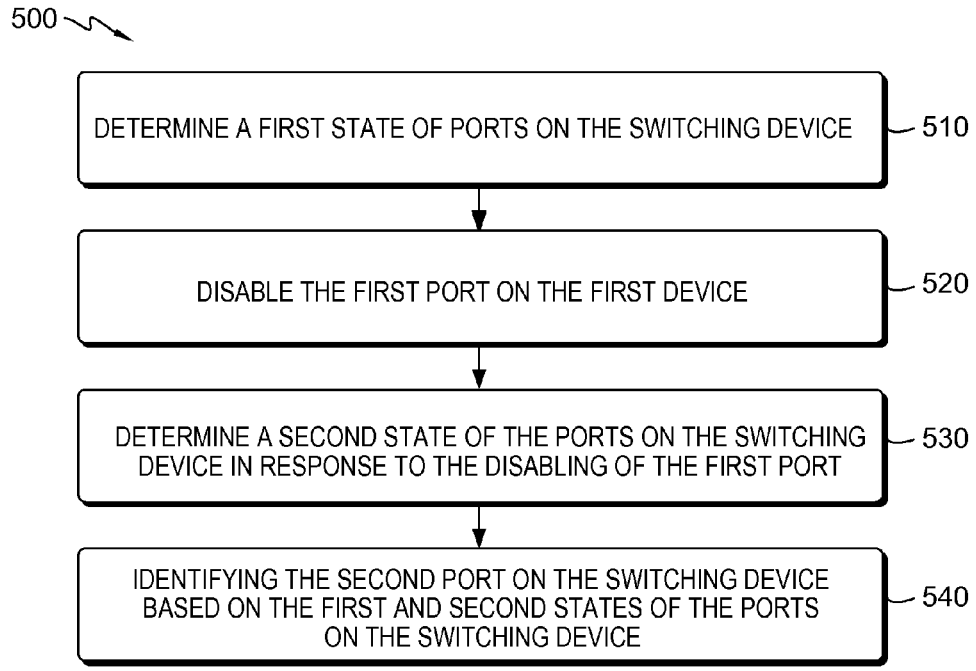
FIG. 5 is a flowchart of a method 500 for connection detection in accordance with embodiments of the present invention.

The method 400 is entered in step 410, where the second port $221_2$ on the switching device 220 is determined based on the given first port $211_1$ on the first device 210, and where the second port is connected to the first port. In some embodiments, this can be done based on the "snapshot" of the port state on the switching device 220. For example, FIG. 5 shows the flowchart of a method 500 of determining the second port on the switching device based on a first port on the first device.

In step 510, a first state of the ports on the switching device 220 is determined. The first state at least indicates whether each port is in an operating condition. For example, in some embodiments, if a port on the switching device 220 is connected to another device, a light associated with the port glows a certain color (for example, green). Therefore, the state of port lights may be recorded to act as the first state. In some embodiments, a port state table may be maintained by the switching device 220 which indicates whether each port on the switching device 220 is connected to another device, and the port state table on the switching device 220 may be obtained to act as the first state.

The method 500 proceeds to step 520, where the first port $211_1$ on the first device 210 is disabled. Then, in step 530, a second state of the ports on the switching device 220 is determined in response to the disabling of the first port $211_1$. Next, in step 540, the second port $221_2$ on the switching device 220 that is connected to the first port $211_1$ is identified based on the first state recorded in step 510 and the second state obtained in step 530 of the ports on the switching device 220. For example, in those embodiments where the port state indicates the state of port light, the port light associated with the second port $221_2$ will change in response to the disabling of the first port $211_1$. For example, the port light will be turned off or glow another color (for example, red). Such change will be captured and reflected in the second state. For example, in other embodiments where the port state table indicates the state of each port, the port state associated with the second port $221_2$ in the port state table will change in response to the disabling of the first port $211_1$. Such change will be captured and reflected in the second state. By comparing the first and second states and determining that the port state associated with the second port $221_2$ in the first state is different from the port state associated with the second port $221_2$ in the second state, the second port $221_2$ may be identified.

Still in reference with FIG. 4, the method 400 proceeds to step 420, where the third port $222_3$ on the switching device is determined. The third port $222_3$ is associated with the second port $221_2$ as determined in step 410. In some embodiments, the third port $222_3$ may be determined by referencing to the configuration information of the switching device that indicates the internal associations between the first and second groups of ports on the switching device 220. For example, in a L1 switch, a patch may indicate the association between the second and third ports $221_2$ and $222_3$. Given the second port $221_2$, third port $222_3$ may be determined based on the configuration information.

Figure 6:
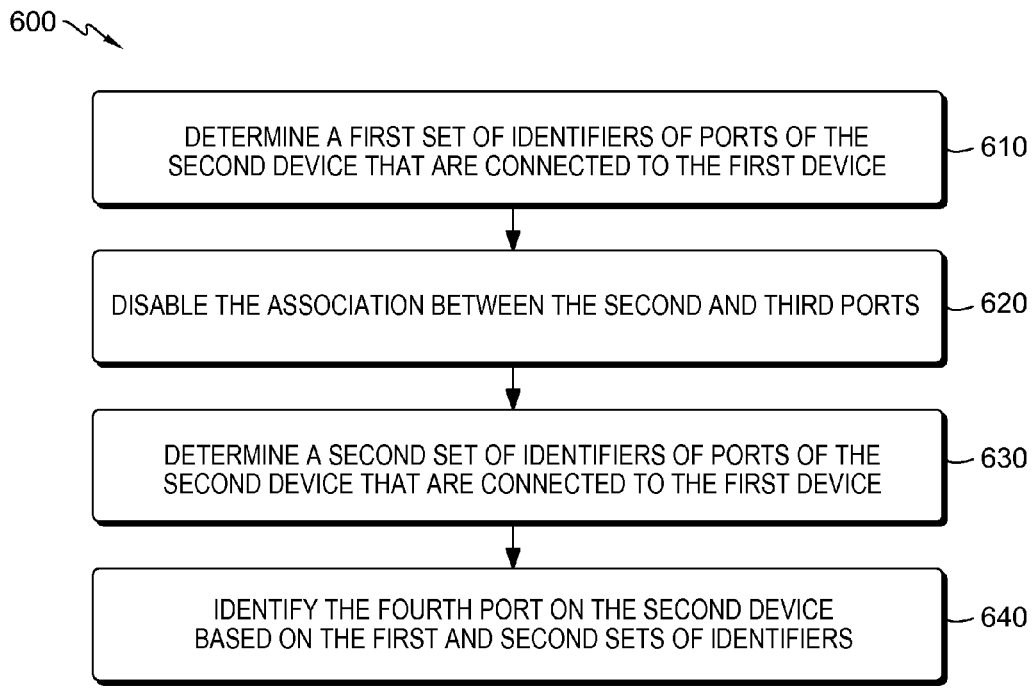
FIG. 6 is a flowchart of a method 600 for connection detection in accordance with embodiments of the present invention.

Next, in step 430, the fourth port $231_4$ on the second device 230 is determined based on the association between the second and third ports $221_2$ and $222_3$, where the fourth port $231_4$ is connected to the third port $222_3$. In some embodiments, the third port $222_3$ is identified by taking snapshot of the ports of the first device 210. FIG. 6 shows the flowchart of such a method 600.

As shown, in step 610, a first set of identifiers of ports 231 of the second device 230 that are connected to the first device 210 is determined. As known, when a port 231 of the second device 230 is connected to the first device 210, the identifier of this port 231 will be provided to the first device for login. For example, the identifier of a port may be a World Wide Port Name (WWPN) of the port or any other suitable identifier. Therefore, at the first device 210, it is possible to collect the identifiers of those ports on the second device 230 which have already been connected to the first device 210.

Then, the method 600 proceeds to step 620 where the association between the second and third ports $221_2$ and $222_3$ is disabled. That is, the internal connection between the second and third ports $221_2$ and $222_3$ is temporarily disabled. In step 630, a second set of identifiers of ports 231 of the second device 230 that are connected to the first device 210 is determined. It would be appreciated that in response to the disabling of the association between the second and third ports $221_2$ and $222_3$, the ports 231 that are connected to the first device 210 will change. More particularly, since the second port $221_2$ is now disconnected from the third ports $222_3$, the fourth port $231_4$ is disconnected from the first device 210. Therefore, the identifier of the fourth port $231_4$ will be absent in the second set of identifiers obtained in step 630. Accordingly, in step 640, by comparing the first and second sets of identifiers which are obtained in steps 610 and 630 respectively and determining that the identifier of the fourth port $231_4$ is present in the first set of identifiers obtained in step 610 but absent in the second set of identifiers obtained in step 630, the fourth port $231_4$ may be identified.

As such, the connection between the first and second devices 210 and 230 can be automatically detected at the port level. That is, it is determined that the fourth port $231_4$ on the second device 230 is connected to the third port $222_3$ on the switching device 220, the third port $222_3$ is internally connected to the second ports $221_2$ of the switching device 220, and the second port $221_2$ is connected to the first port $211_1$ on the first device 210.

Figure 7:
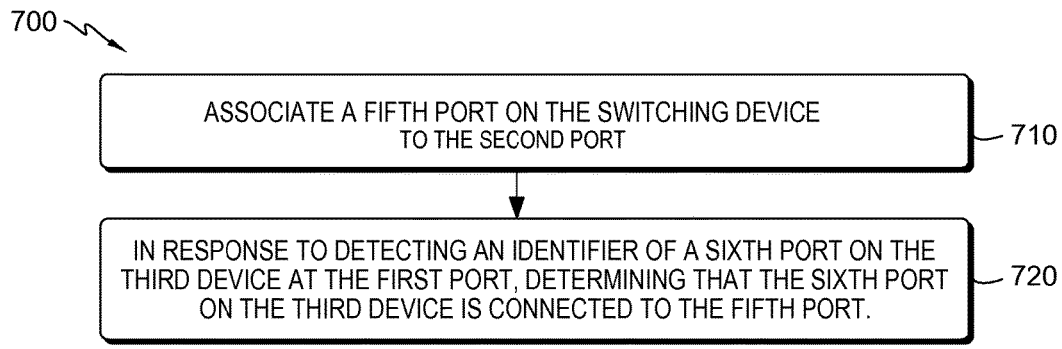
FIG. 7 is a flowchart of a method 700 for connection detection in accordance with embodiments of the present invention.

In some embodiments, it is possible to further determine one or more other connections based on the connection between the first and second ports $211_1$ and $221_2$. An example embodiment will be discussed with reference to FIGS. 7 and 8. FIG. 7 shows a flowchart of a method 700 for connection detection. In some embodiments, the method 700 may be carried out after the method 400. However, it is to be understood that the method 400 is not necessarily performed prior to the method 700. For example, in some embodiments, the connection between the first and second ports $211_1$ and $221_2$ may be specified by a user or determined by any other methods, either currently known or to be developed in the future. In such embodiments, the method 700 can be carried out without first performing the method 400.

In step 710, the second port $221_2$ on the switching device 220 is associated with a fifth port on the switching device 220. For example, in those embodiments where the switching device 220 is a L1 switch in a SAN system, a patch may be created to internally connect the second port $221_2$ to the fifth port. Only for the purpose of illustration, it is supposed that the fifth port is the port $222_1$ in this example.

Figure 8:
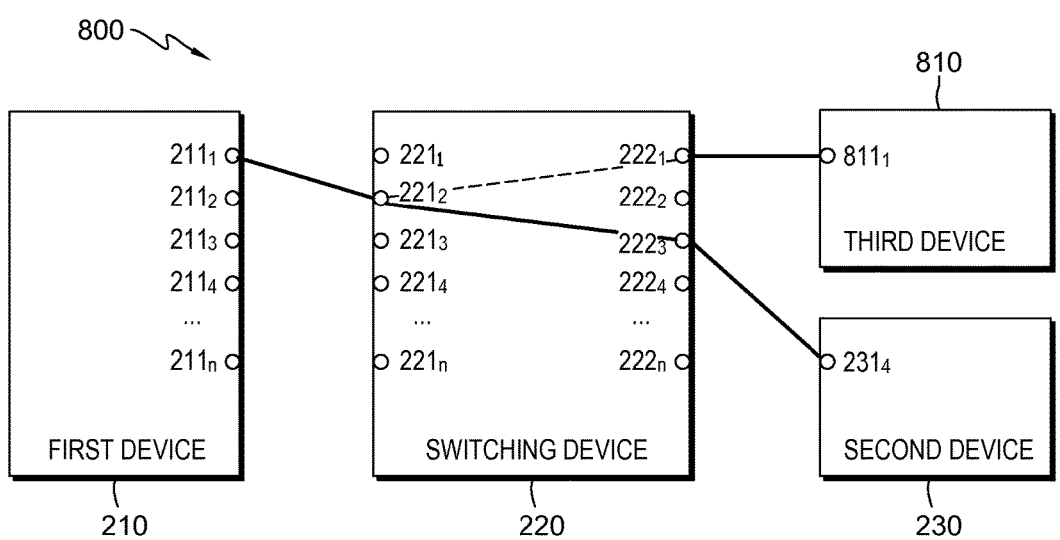
FIG. 8 is a schematic diagram for detecting another connection based on the detected connection in accordance with embodiments of the present invention.

The method 700 then proceeds to step 720 to determine a port that is connected the fifth port $222_1$. It is supposed that the fifth port $222_1$ is connected to a sixth port $811_1$ on a third device 810 as shown in an environment 800 as depicted in FIG. 8. It is to be understood that the third device 810 may or may not be the same as the second device 230 shown in FIGS. 2 and 3. In this example, in response to the association of the second and fifth ports $221_1$ and $222_1$, the sixth port $811_1$ will be connected to the first port $211_1$ via the switching device 220. At this point, the identifier of the sixth port $811_1$ will be provided to the first port $211_1$. Accordingly, in step 720, it may be determined that the sixth port $811_1$ on the third device 810 is connected to the fifth port $222_1$ in response to detecting the identifier of the sixth port $811_1$ on the third device 810 at the first port $211_1$. By associating the second port $221_2$ to different ports in the second group of ports 222, other port-level connections may be detected based on the connection between the first and second ports $211_1$ and $221_2$.

Figure 9:
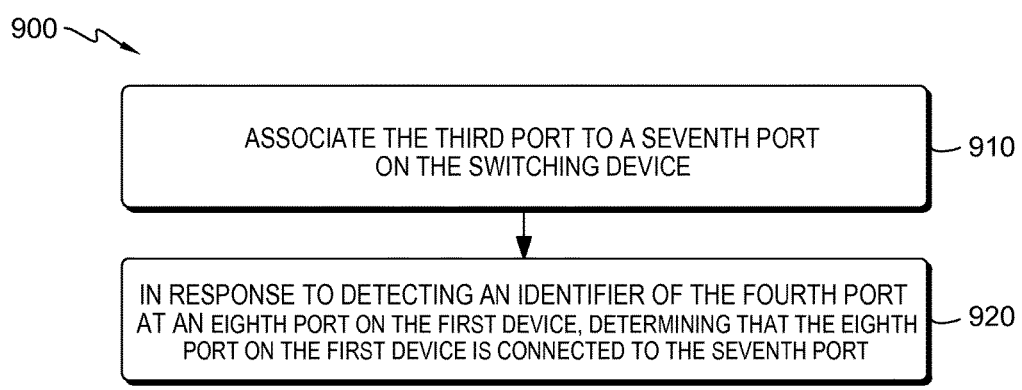
FIG. 9 is a flowchart of a method 900 for connection detection in accordance with embodiments of the present invention.

Likewise, it is possible to detect the connections based on the connection between the third and fourth ports $222_3$ and $231_4$. An example embodiment will be discussed with reference to FIGS. 9 and 10. FIG. 9 shows a flowchart of a method 900 for connection detection. Similar to the method 700, on some embodiments, the method 900 may be carried out after the method 400. Alternatively, in other embodiments where the connection between the third and fourth ports $222_3$ and $231_4$ is otherwise determined, the method 900 may be separately performed. In some embodiments, the method 900 may be carried out before or after the method 700. The methods 700 and 900 may be carried out concurrently as well.

In step 910, the third port $222_3$ on the switching device 220 is associated with a seventh port on the switching device 220. For example, in those embodiments where the switching device 220 is a L1 switch in a SAN system, a patch may be created to internally connect the third port $222_3$ to the seventh port. Only for the purpose of illustration, it is supposed that the seventh port is the port $221_1$ in this example.

Figure 10:
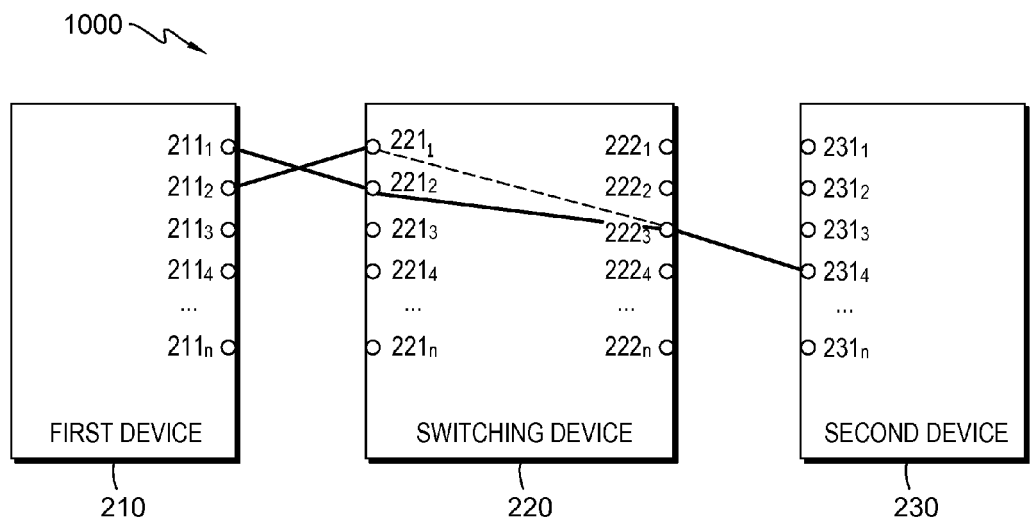
FIG. 10 is a schematic diagram for detecting yet another connection based on the detected connection in accordance with embodiments of the present invention.

The method 900 then proceeds to step 920 to determine a port on the first device 210 that is connected to the seventh port $221_1$. In response to the association of the third and seventh ports $222_3$ and $221_1$, information may be obtained at the first device 210. It is supposed that the seventh port $221_1$ is connected to an eighth port $211_2$ on the first device 210 as shown in an environment 1000 as depicted in FIG. 10. In this example, in response to the association of the third and seventh ports $222_3$ and $221_1$, the eighth port $211_2$ will be connected to the fourth port $231_4$ via the switching device 220. At this point, the identifier of the fourth port $231_4$ will be provided to the eighth port $211_2$. Accordingly, in step 920, the eighth port $211_2$ that is connected to the seventh port $221_1$ may be determined in response to detecting an identifier of the fourth port $231_4$ at the eighth port $211_2$ on the first device 210. By associating the third port $222_3$ to different ports in the first group of ports 221, other port-level connections may be detected based on the connection between the third and fourth ports $222_3$ and $231_4$.

In some embodiments, the methods 700 and 900 may be carried out concurrently, which may be known as "cross-patch connection detection" for determining one end-to-end port-level connection based on one determined end-to-end port-level connection, as described above. Likewise, the combination of the methods 700 and 900 may be performed to determine a plurality of connections based on a same number of determined connections at the same time. As such, the count of determined end-to-end port-level connections would be exponentially increased until all of the end-to-end port-level connections are figured out.

It would be appreciated that in some embodiments, the methods 400, 500, 600, 700 and/or 900 may be performed by the first device, which may be a high-level switch in the SAN, for example. In other embodiments, some or all of these methods may be performed by another device responsible for connection detection.

It would be appreciated that in a SAN system or the like, a device may have a plurality of ports and it is necessary to determine the connections concerning each of these ports. In some embodiments, the ports may be grouped such that the connection detections can be performed group by group. That is, in such embodiments, prior to detecting any connections, ports of high-level switches may be grouped based on characteristics of connections related to the ports, and then the operations for connection detection on each group may be taken sequentially. The purpose of the grouping of the ports is to make sure that the connections related to the ports in one group are independent from each other, so that the influence on regular services provided by the SAN caused by temporality disabling or changing some internal connections within the switching device during the operations for connection detection will be minimized. For example, in one embodiment, the grouping may be performed on the ports of the first device, which may be a high-level switch in the SAN. The grouping of the ports on the first device may be performed based on the characteristics of the connections related to the ports, which may include, for example, hosts side application scenarios, storage physical configurations and/or inter switch link (ISL). In one embodiment, for example, it may be determined that a ninth port of the first device is connected to the second device, where the first and ninth ports are both connected to a same device for a same application scenario, then the ports of the first device for connection detection are grouped such that the first and ninth ports are assigned to two separate groups. In some embodiments, for example, it may be determined that a tenth port of the first device is connected to the third device, where the second and third devices may belong to different kinds of devices, such as one is a host device and the other is a storage device. Although the second and third devices may be used for a same application scenario, the ports of the first device for connection detection are grouped such that the first and tenth ports are assigned to two separate groups due to the different kinds of the second and third devices. After grouping the ports for connection detection, the methods for automate connection detection, such as the methods 400, 500, 600, 700 and 900, can be performed group by group.

Figure 11:
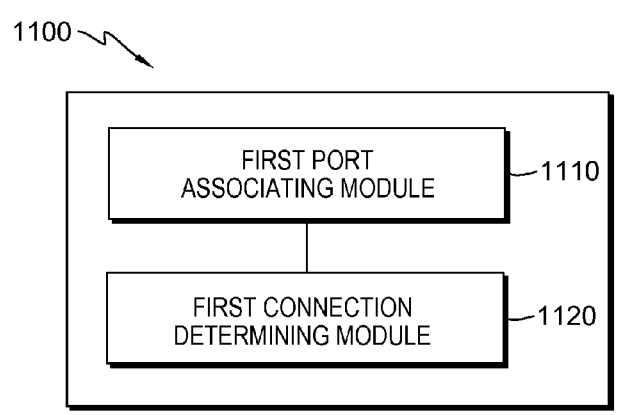
FIG. 11 is a block diagram of an apparatus 1100 for connection detection in accordance with embodiments of the present invention.

FIG. 11 shows a block diagram of an apparatus 1100 for connection detection in accordance with embodiments of the present invention. As shown in FIG. 11, the apparatus 1100 for use in an environment including a first device and a switching device, a first port on the first device being connected to a second port on the switching device, comprises a first port associating module 1110 configured to associate a fifth port on the switching device to the second port. The apparatus 1100 further comprises a first connection determining module 1120 configured to determine that a sixth port on a third device is connected to the fifth port in response to detecting an identifier of the sixth port on the third device at the first port on the first device.

In some embodiments, the environment in which the apparatus 1100 may be used may further include a second device, a fourth port on the second device being connected to a third port on the switching device, and the apparatus 1100 may further comprise a second port associating module configured to associate the third port to a seventh port on the switching device; and a second connection determining module configured to determine that the eighth port on the first device is connected to the seventh port in response to detecting an identifier of the fourth port at an eighth port on the first device.

For the sake of clarity, FIG. 11 does not show optional modules included in the apparatus 1100. It is to be understood that all features as described above with reference to FIG. 1 to FIG. 10 apply to the apparatus 1100.

In addition, partitioning of modules in the apparatus 1100 is merely for the purpose of illustration without suggesting any limitation as to the scope of the present invention. It is also to be understood that the modules included in the apparatus 1100 may be implemented by various manners, including software, hardware, firmware or any combination thereof. For example, in some embodiments, one or more of the modules may be implemented by software and/or firmware. Alternatively, or in addition, one or more of the modules may be implemented by hardware such as an integrated circuit (IC) chip, an application-specific integrated circuit (ASIC), a system on chip (SOC), a field programmable gate array (FPGA), or the like.

The present invention may be a system, an apparatus, a device, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present invention. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for use in an environment including a first device, a second device, and a switching device, a first port on the first device being connected to a second port on the switching device, a fourth port on the second device being connected to a third port on the switching device, and the second port is associated with the third port on the switching device, the method comprising:

associating, by one or more computer processors, a fifth port on the switching device to the second port;

in response to detecting an identifier of a sixth port on a third device at the first port on the first device, determining, by one or more computer processors, that the sixth port on the third device is connected to the fifth port;

associating, by one or more computer processors, the third port to a seventh port on the switching device;

in response to detecting an identifier of the fourth port at an eighth port on the first device, determining, by one or more computer processors, that the eighth port on the first device is connected to the seventh port; and detecting, by one or more computer processors, a connection between the first port and the fourth port by determining the second port on the switching device is connected to the first port, the third port on the switching device is associated with the second port, and the fourth port on the second device is connected to the third port based on the association between the second and third ports wherein determining the fourth port on the second device is connected to the third port includes determining a first set of identifiers of one or more ports of the second device that are connected to the first device, disabling the association between the second and third ports, determining a second set of identifiers of one or more ports of the second device that are connected to the first device in response to the disabling of the association between the second and third ports, and identifying the fourth port on the second device based on the first and second sets of identifiers.

2. The method of claim 1, further comprising:

obtaining, by one or more computer processors, configuration information indicating one or more connections between the first device and the second device;

determining, by one or more computer processors, a plurality of characteristics of the one or more connections from the obtained configuration information; and grouping, by one or more computer processors, one or more ports of the first device for connection detection based on the plurality of characteristics of the one or more connections.

3. The method of claim 1, wherein determining the second port on the switching device that is connected to the first port comprises:

determining, by one or more computer processors, a first state of one or more ports on the switching device, the first state indicating work states of the one or more ports on the switching device;

disabling, by one or more computer processors, the first port on the first device;

determining, by one or more computer processors, a second state of the one or more ports on the switching device in response to the disabling of the first port, the second state indicating work states of the one or more ports on the switching device; and identifying, by one or more computer processors, the second port on the switching device based on the first and second states of the one or more ports on the switching device.

4. The method of claim 1, wherein determining the third port on the switching device that is associated with the second port comprises:

obtaining, by one or more computer processors, configuration information of the switching device, the configuration information indicating one or more connections among one or more ports on the switching device; and determining, by one or more computer processors, the third port that is associated with the second port based on the obtained configuration information.

5. The method of claim 1, wherein at least one of the first and second devices includes at least a host and a switch in a storage area network (SAN), and wherein the switching device includes a Layer 1 switch in the SAN.

6. An apparatus for use in an environment including a first device, a second device, and a switching device, a first port on the first device being connected to a second port on the switching device, a fourth port on the second device being connected to a third port on the switching device, and the second port is associated with the third port on the switching device, the apparatus comprising:
at least one processing unit; and
at least one computer readable tangible storage device having instructions stored thereon for execution by the at least one processing unit, the instructions, when executed by the at least one processing unit, cause the device to perform actions including:
associating a fifth port on the switching device to the second port;
in response to detecting an identifier of a sixth port on a third device at the first port on the first device, determining that the sixth port on the third device is connected to the fifth port
associating, by one or more computer processors, the third port to a seventh port on the switching device;
in response to detecting an identifier of the fourth port at an eighth port on the first device, determining, by one or more computer processors, that the eighth port on the first device is connected to the seventh port; and
detecting, by one or more computer processors, a connection between the first port and the fourth port by determining the second port on the switching device is connected to the first port, the third port on the switching device is associated with the second port, and the fourth port on the second device is connected to the third port based on the association between the second and third ports wherein determining the fourth port on the second device is connected to the third port includes determining a first set of identifiers of one or more ports of the second device that are connected to the first device, disabling the association between the second and third ports, determining a second set of identifiers of one or more ports of the second device that are connected to the first device in response to the disabling of the association between the second and third ports, and identifying the fourth port on the second device based on the first and second sets of identifiers.

7. The apparatus of claim 6, wherein the actions further include:
obtaining configuration information indicating connections between the first device and the second device;
determining a plurality of characteristics of the connections from the obtained configuration information; and
grouping one or more ports of the first device for connection detection based on the plurality of characteristics of the connections.

8. The apparatus of claim 6, wherein determining the second port on the switching device that is connected to the first port comprises:
determining a first state of one or more ports on the switching device, the first state indicating work states of the one or more ports on the switching device;
disabling the first port on the first device;
determining a second state of the one or more ports on the switching device in response to the disabling of the first port, the second state indicating work states of the one or more ports on the switching device; and
identifying the second port on the switching device based on the first and second states of the one or more ports on the switching device.

9. The apparatus of claim 6, wherein determining the third port on the switching device that is associated with the second port comprises:
obtaining configuration information of the switching device, the configuration information indicating connections among one or more ports on the switching device; and
determining the third port that is associated with the second port based on the obtained configuration information.

10. The apparatus of claim 6, wherein at least one of the first and second devices includes at least a host and a switch in a storage area network (SAN), and wherein the switching device includes a Layer 1 switch in the SAN.

11. A computer program product, the computer program product comprising:
at least one computer readable tangible storage device, and program instructions stored on the at least one computer readable tangible storage device, the stored program instructions, when executed on a device for use in an environment including a first device a second device, and a switching device, a first port on the first device being connected to a second port on the switching device, a fourth port on the second device being connected to a third port on the switching device, and the second port is associated with the third port on the switching device, causing the device to:
associate a fifth port on the switching device to the second port;
in response to detecting an identifier of a sixth port on a third device at the first port on the first device, determine that the sixth port on the third device is connected to the fifth port
associating, by one or more computer processors, the third port to a seventh port on the switching device;
in response to detecting an identifier of the fourth port at an eighth port on the first device, determining, by one or more computer processors, that the eighth port on the first device is connected to the seventh port; and
detecting, by one or more computer processors, a connection between the first port and the fourth port by determining the second port on the switching device is connected to the first port, the third port on the switching device is associated with the second port, and the fourth port on the second device is connected to the third port based on the association between the second and third ports wherein determining the fourth port on the second device is connected to the third port includes determining a first set of identifiers of one or more ports of the second device that are connected to the first device, disabling the association between the second and third ports, determining a second set of identifiers of one or more ports of the second device that are connected to the first device in response to the disabling of the association between the second and third ports, and identifying the fourth port on the second device based on the first and second sets of identifiers.

12. The computer program product of claim 11, wherein the instructions, when executed on the device, further cause the device to:
obtain configuration information indicating connections between the first device and the second device;
determine a plurality of characteristics of the connections from the obtained configuration information; and
group one or more ports of the first device for connection detection based on the plurality of characteristics of the connections.

\* \* \* \* \*